(12) United States Patent
Waseda et al.

(10) Patent No.: US 7,828,485 B2
(45) Date of Patent: Nov. 9, 2010

(54) ROLLER BEARING

(75) Inventors: Yoshitaka Waseda, Nisshin (JP); Tsuyoshi Okumura, Yamatokoriyama (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 412 days.

(21) Appl. No.: 12/076,636

(22) Filed: Mar. 20, 2008

(65) Prior Publication Data

US 2008/0240641 A1    Oct. 2, 2008

(30) Foreign Application Priority Data

Mar. 21, 2007    (JP)    ............................ P2007-073782

(51) Int. Cl.
*F16C 33/60*    (2006.01)
(52) U.S. Cl. ...................... 384/570; 384/457; 384/564
(58) Field of Classification Search ................ 384/570, 384/457, 564, 569, 577
See application file for complete search history.

(56) References Cited

U.S. PATENT DOCUMENTS

| | | | | |
|---|---|---|---|---|
| 1,500,902 A | * | 7/1924 | Sewell | ......................... 384/570 |
| 2,894,791 A | * | 7/1959 | White et al. | ................. 384/564 |
| 3,248,155 A | * | 4/1966 | Schaeffler | ..................... 384/564 |
| 5,810,482 A | * | 9/1998 | Aleynik | ....................... 384/564 |
| 6,176,623 B1 | * | 1/2001 | Zeigler | ......................... 384/569 |
| 2005/0084192 A1 | * | 4/2005 | Takeo et al. | .................. 384/457 |

FOREIGN PATENT DOCUMENTS

JP    2006-322581    11/2006

* cited by examiner

*Primary Examiner*—Thomas R Hannon
(74) *Attorney, Agent, or Firm*—McGinn IP Law Group, PLLC

(57) ABSTRACT

The clearance between the outer peripheral surface of an annular portion of a cage and the inner peripheral surface of each of rib portions of outer-ring split pieces is set to be smaller than the clearance between the radial end surface of a projection portion of the cage and the inner peripheral surface of each of body portions of the outer-ring split pieces. When a centrifugal force due to engine rotation acts upon the cage, the inner peripheral surface of each of the rib portions of the outer-ring split pieces touches the outer peripheral surface of the annular portion of the cage before the inner peripheral surface of each of the body portions of the outer-ring split pieces touches the radial end surface of the projection portion of the cage. Thus, the radial displacement of the cage can be prevented in good time.

4 Claims, 7 Drawing Sheets

SECTION A-A

SECTION X-X

SECTION Y-Y

SECTION B-B

ROLLER BEARING

BACKGROUND OF THE INVENTION

1. Field of the Invention

The present invention relates to a roller bearing and, more particularly, to a roller bearing suitable for rotating shafts, such as a crankshaft and a camshaft, disposed in engine housings.

2. Related Art

Recently, roller bearings have generally been used for rotatably supporting rotating shafts, such as a crankshaft and a camshaft, disposed in engine housings (e.g., a cylinder block and a cylinder head). In such a case, an inner ring of the roller bearing can be omitted therefrom by utilizing the outer peripheral surface of the rotating shaft directly as a raceway surface. Thus, the diameter-reduction (miniaturization) of the roller bearing can easily be achieved by simultaneously maintaining load capacity. However, because the bearing, from which the inner ring is omitted, lacks a means for fixing the bearing to the rotating shaft, it is necessary to restrict the axial displacement of a cage. Further, in the case of such a rotating shaft, a large centrifugal force acts upon the roller bearing with engine rotation. Thus, it is also necessary to consider the radial displacement of the cage. Especially, in the case of a crankshaft, the outer ring of the bearing is split into two parts, there is a fear that when the cage is moved (displaced) in an axial direction and a radial direction so as to touch an outer-ring splitting position, an excessive internal stress is generated in the cage.

Thus, the following technique is disclosed (see, e.g., JP-A-2006-322581). That is, a convex portion that outwardly and radially protrudes is provided at each of both axial end portions of the cage. The convex portions of the cage are mounted along the end surfaces of the split outer ring, respectively, so as to restrict the axial displacement of the cage.

According to JP-A-2006-322581, the convex portions of the cage rotate while contacted with the end surfaces of the split outer ring. Thus, there are still fears that a torque loss may be caused due to the sliding resistance generated therebetween, and that excessive internal stresses may be generated in the cage. Additionally, the radial displacement of the cage due to the centrifugal force due to the engine rotation is not sufficiently considered.

SUMMARY OF THE INVENTION

A problem that the invention is to solve is to provide a roller bearing that can achieve the diameter reduction thereof by omitting the inner ring, and that can prevent the cage thereof from being axially and radially displaced.

To achieve the solution of the aforementioned problem, according to the invention, there is provided a roller bearing comprising:

an outer ring cylindrically formed by combining a pair of split pieces split in a circumferential direction with each other so as to have an axis line in common with a rotating shaft;

a plurality of rollers disposed rollably between raceway surfaces respectively formed on an inner peripheral surface of said outer ring and an outer peripheral surface of said rotating shaft; and an annular cage configured to circumferentially hold said rollers at predetermined intervals, wherein said outer ring comprises body portions formed in an axial intermediate portion thereof and a pair of rib portions, the outer-ring-side raceway surface being formed on an inner peripheral surface of each of said body portions, each of said rib portions being formed so as to extend toward the axis line from both axial end portions configured to sandwich each of said body portions so that an end surface thereof is located radially inwardly from the outer-ring-side raceway surface of an associated one of said body portions;

said rollers roll about on the raceway surfaces respectively formed on the inner peripheral surfaces of said body portions of said outer rings and the outer peripheral surface of said rotating shaft;

said cage comprises a pair of annular portions continuously formed over the entirety of a circumference axially outwardly from both end surfaces of said rollers, and a plurality of column portions configured to connect said annular portions along an axial direction circumferentially at predetermined intervals so as to form pockets in which said roller are accommodated, a projection portion formed integrally with each of said column portions such that said projection portion protrudes outwardly over outer peripheral surfaces of said annular portions; and the outer peripheral surface of each of said annular portions of said cage is disposed so as to face the inner peripheral surface of an associated one of said rib portions of said outer rings via a predetermined clearance.

Thus, in a roller bearing for rotatably supporting, for example, a rotating shaft disposed in a housing of an engine, raceway surfaces are formed on the inner peripheral surface of an outer ring and the outer peripheral surface of the rotating shaft. Consequently, the inner ring can be omitted. Accordingly, the diameter reduction (miniaturization) of the roller bearing can be achieved. The peripheral surface of each of the rollers is radially contacted with the raceway surfaces formed on the inner peripheral surfaces of the body portions of the outer ring and the outer peripheral surface of the rotating shaft. The outer peripheral surface of each of the annular portions of the cage is disposed (at an axial end portion) so as to face the inner peripheral surface of an associated one of the rib portions of the cage via a predetermined clearance. Consequently, the outer peripheral surface of each of the annular portions of the cage can be guided by the inner peripheral surface of an associated one of the rib portions of the outer ring. Accordingly, the radial displacement of the cage can be prevented. Thus, a torque loss can be prevented from being caused due to the sliding resistance of the cage. Also, the occurrence of a loss (or the generation of a chip) due to the generation of an excessive internal stress in the cage can be prevented.

Incidentally, the expression "housing of an engine" designates, in particular, a cylinder block, and a cylinder head. The term "rotating shaft" generally denotes a crankshaft and a camshaft.

In a case where the rotating shaft is a crankshaft, the roller bearing according to the invention can be applied to any of a crank journal and a crank pin. In a case where the rotating shaft is a camshaft, the roller bearing according to the invention can be applied to a builtup camshaft. Accordingly, as long as the outer ring is constituted by a circumferentially bi-split type one (i.e., a two-piece outer ring), the invention can be applied to the roller bearing without regards to any of the circumferentially split type cage (including the C-type split cage whose split place is one place) and the integral type cage that is not circumferentially split.

According to the invention, preferably, the roller bearing is configured so that a radial leading end surface of each of the projection portions of the cage is disposed so as to face the inner peripheral surface of an associated one of the body portions of the outer ring via a predetermined clearance at the axial intermediate portion, and that a clearance S1 from the outer peripheral surface of each of the pair of annular portions of the cage to an associated one of the inner peripheral surfaces of the pair of rib portions of the outer ring is formed so as to be smaller than a clearance S2 from the radial leading end surface of each of the projection portions of the cage to a peripheral inner surface of a corresponding one of the body portions of the outer ring. When a centrifugal force due to engine rotation acts upon the cage, the inner peripheral surface of each of the rib portions of the outer-ring split pieces touches the outer peripheral surface of the annular portion of the cage before the inner peripheral surface of each of the body portions of the outer-ring split pieces touches the radial leading end surface of the projection portion of the cage. Consequently, the radial displacement of the cage can be prevented in good time. Accordingly, a torque loss can be prevented from being caused due to the sliding resistance between the radial leading end surface of the projection portion of the cage and the inner peripheral surface (raceway surface) of each of the body portions of the outer ring. Also, a loss (or a chip) can be prevented from being generated due to the generation of an excessive internal stress in the cage by causing the cage to touch the outer ring at the split place.

Thus, the clearance S1 from the outer peripheral surface of each of the annular portions of the cage to an associated one of the inner peripheral surfaces of the pair of rib portions of the outer ring is formed so as to be smaller than the clearance S2 from the radial leading end surface of each of the projection portions of the cage to the peripheral inner surface of a corresponding one of the body portions of the outer ring. In this case, the following inequalities (1) and (2) hold:

$$D1 < d1 < D2 < d2 \quad (1)$$

$$d1 - D1 = 2S1 < 2S2 = d2 - D2 \quad (2)$$

where D designates an outside diameter of the annular portion 5a of the cage 5, D2 denotes a virtual outside diameter of the projection portion 5c of the cage 5, d1 represents an inside diameter of each of the rib portions 2c ands 3c of the outer-ring split pieces 2 and 3, and d2 designates an inside diameter of each of the body portions 2b and 3b of the outer-ring split pieces 2 and 3.

Further, a roller holding surface, which is inclined so as to become closer to the pocket towards a radially outward side thereof, can be formed on each of the projection portions of the cage. The roller can be prevented by forming such a roller holding surface from slipping off the cage at the assembly of the bearing. Additionally, the radial relative displacement (disengagement) between the roller and the cage due to the centrifugal force can be prevented.

At that time, the roller bearing can be adapted so that the cage is split at least one place in a circumferential direction by a split surface that includes the column portions and the projection portions and that extends along an axial direction, that the leading end surface of each of the projection portions, which are disposed on both sides of the split surface so as to face each other across the split surface, includes a first inclined surface inclined so as to be located closer to a radial inward side towards the split surface, and that both end surfaces of each of the projection portions, which are located at both ends of the split surface, include second inclined surfaces configured to be placed closer to an axially inward side towards the split surface.

In a case where the cage is of the split type, chamfering is performed on the split place, so that inclined surfaces are formed, which incline (like, e.g., a letter "V") to the split surfaces from two directions, respectively. More specifically, the first inclined surfaces formed on the leading end surfaces of the projection portions are arranged so as to butt against each other. Further, the second inclined surfaces formed on the leading end surfaces of the projection portions are arranged so as to butt against each other. Consequently, even in a case where the split surfaces of the cage vibrate (or are displaced from each other) during the rotation of the rotating shaft, the cage is difficult to touch (or collide with) the split places on the outer-ring split pieces. Thus, a loss (or a chip) can be prevented from being generated due to an excessive internal stress generated in the cage.

Incidentally, in a case where the end surface of the roller touches the inner-side end surface of the rib portion of the outer ring, and where the cage is formed so that the axial length of each of the projection portions of the cage is smaller than the length of each of the rollers, the axial displacement of the cage can be prevented while the projection portions of the cage are non-contacted with the outer ring. Accordingly, a torque loss can be prevented from being generated due to the sliding resistance of the cage. Also, a loss (or a chip) can be prevented from being generated due to the generation of an excessive internal stress in the cage.

Therefore, in a case where the rotating shaft is a crankshaft or a camshaft, and where the outer ring and the cage can be circumferentially split, the invention can preferably be implemented. That is, each of the outer ring and the cage is circumferentially split into two split pieces. Then, these split pieces are combined with each other and are formed into a cylindrical shape. Incidentally; in a case where the cage is made of a polymer material (or a synthetic-resin material), the roller bearing can use the cage of the type (what is called the C-type split type) that is cut at one place in a circumferential direction, and that is attached to and detached from the rotating shaft via an opening formed by spreading a cut gap utilizing elastic deformation.

On the other hand, in a case where the rotating shaft is a builtup camshaft having a cam lobe that is detachable from the direction of an axis line, the cage can be formed so as to be unable to be split in a circumferential direction. That is, even in a case where the cage is of the integral type that cannot be circumferentially split, the cage can be mounted on the camshaft when the cage is in a state in which the cam lobe is detached from a shaft body.

DETAILED DESCRIPTION OF THE PREFERRED EMBODIMENTS

Embodiment 1

Figure 1:
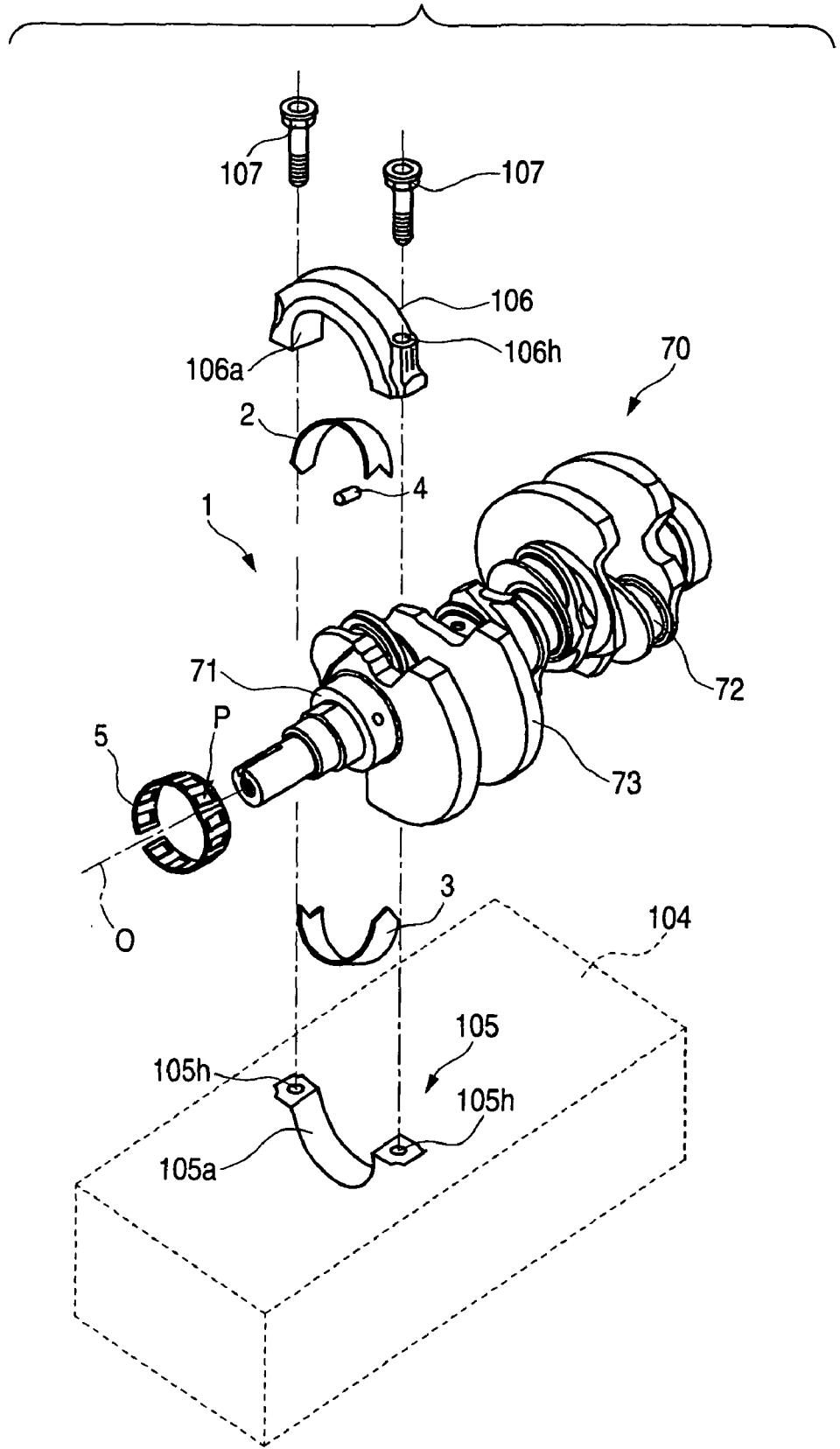
FIG. 1 is an exploded perspective view illustrating an example of a crankshaft having a roller bearing according to the invention.

Hereinafter, embodiments of the invention are described with reference to the accompanying drawings. FIG. 1 is an exploded perspective view illustrating an example of a crankshaft having a roller bearing according to the intention. A crank journal 71 of a crankshaft 70 (corresponding to the rotating shaft) is put on a seat 105 (corresponding to the outer ring fixing member) formed integrally with a cylinder block (housing) 104 of an engine. The seat 105 and a cap member 106 (corresponding to the outer ring fixing member), which is disposed so as to upwardly face the seat 105 across the crank journal 71, are clamp-fixed to each other via a needle roller bearing (hereunder referred to simply as a roller bearing) 1. That is, the crank shaft 70 is rotatably supported by the roller bearing 1 on the cylinder block 104.

More specifically, paired internal thread holes 105h, and 105h are formed in the seat 105. Paired insertion holes 106h, and 106h are formed in the cap member 106. The cap member 106 is fixed to the seat 105 by respectively screwing bolts 107, and 107, which are passed through the insertion holes 106h, and 106h, into the internal thread holes 105h, and 105h. The roller bearing 1 is held inside the combination of a semicylindrical concave portion 105a formed in the seat 105 and a semicylindrical concave portion 106a formed in the cap member 106. That is, paired split outer rings (hereunder referred to simply as outer rings) 3 and 2 are fixed to the seat 105 and the cap member 106 integrally therewith, respectively. The crank journal 71 (crank shaft 70) is connected to the outer rings 3 and 2 as an inner ring that can perform relative rotation with respect thereto. Incidentally, the crankshaft 70 includes a crank pin 72, a counter weight 73, and so on.

Figure 2:
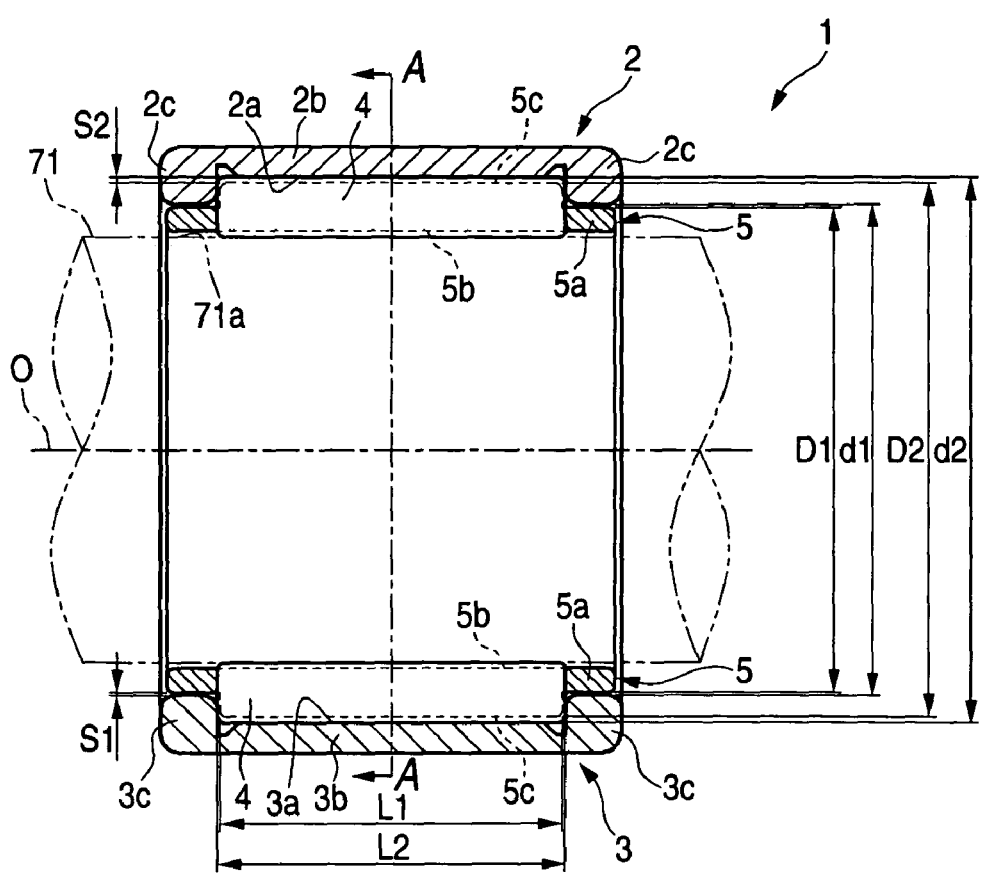
FIG. 2 is a front cross-sectional view illustrating the roller bearing shown in FIG. 1.
Figure 3:
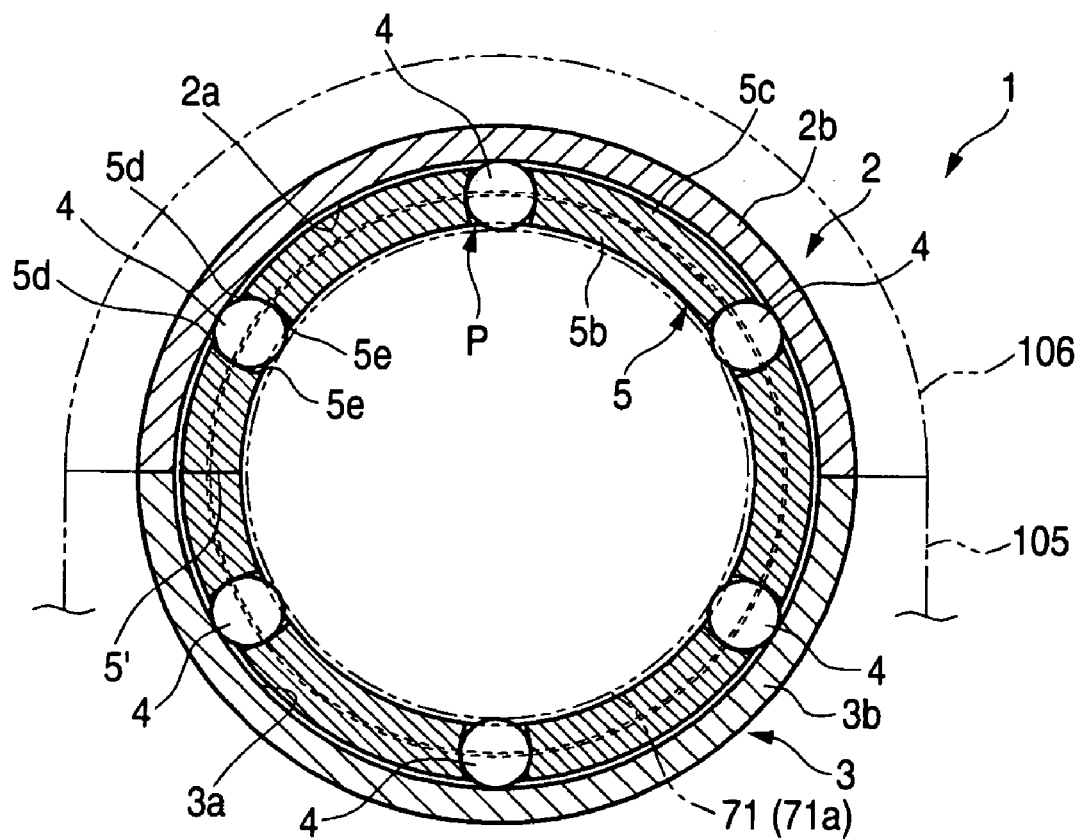
FIG. 3 is a cross-sectional view taken on line A-A shown in FIG. 2.

FIG. 2 is a front cross-sectional view illustrating the roller bearing. FIG. 3 is a cross-sectional view taken on line A-A shown in FIG. 2. As illustrated in FIGS. 2 and 3, the roller bearing 1 includes paired copper outer-ring split pieces 2, and 3, a plurality of (e.g., 6) copper needle rollers (hereunder sometimes referred to simply as rollers) 4, and a synthetic-resin annular C-type split cage (hereunder sometimes referred to simply as a cage) 5. The outer-ring split pieces 2 and 3 are obtained by circumferential bi-splitting of an outer ring, and are combined into a cylindrical shape so as to have the crank journal 71 and the axis line O in common. The rollers 4 are rollably arranged between a journal-side raceway surface 71a formed on the outer peripheral surface of the crank journal 71 and each of outer-ring-side raceway surfaces 2a and 3a respectively formed on the inner peripheral surfaces of the outer-ring split pieces 2 and 3. A cage 5 accommodates and holds the rollers 4 in pocket holes (corresponding to the pockets) which are circumferentially formed as through holes at predetermined angular intervals (e.g., 60°). The cage 5 is cut at one circumferential place and is attached to and detached from the crank journal 71 through an opening, which is formed by spreading the gap between split surfaces (cut surfaces) 5', by elastically deforming.

Each of the outer-ring split pieces 2 and 3 includes an associated one of body portions 2b and 3b formed at an associated axially intermediate portion, and includes also an associated one of paired rib portions 2c and 3c respectively formed at both axially end portions. The paired rib portions 2c and 3c are formed over the entire circumference of a combination of the outer-ring split pieces 2 and 3 so as to extend radially inwardly from the outer-ring-side raceway surfaces 2a and 3a to the axis line O so that an end surface of each of paired rib portions 2c and 3c is located radially inwardly from an associated one of the outer-ring-side raceway surfaces 2a and 3a.

The rollers 4 are such that the peripheral surfaces thereof radially touch the outer-ring-side raceway surfaces 2a and 3a formed on the inner peripheral surfaces of the body portions 2b and 3b of the outer-ring split pieces 2 and 3 and the journal-side raceway surface 71a formed on the outer peripheral surface of the crank journal 71, and that the peripheral surfaces thereof axially touch the inner end surfaces of the rib portions 2c and 3c of the outer-ring split pieces 2 and 3.

The cage 5 includes paired annular portions 5a and 5a and a plurality of (e.g., 6) column portions 5b. Each of the paired annular portions 5a and 5a is continuously formed over the entire circumference thereof axially outwardly from an associated one of both end surfaces of the rollers 4. The plurality of column portions 5b are formed so as to circumferentially connecting the paired annular portions 5a and 5a at predetermined angular intervals (e.g., 60°) along an axial direction so that pocket holes P for accommodating the rollers 4 are formed. Moreover, a projection portion 5c protruded radially outwardly from the outer peripheral surface of the annular portion 5a is formed integrally with each of the column portions 5b.

Thus, an inner ring is omitted by forming the outer-ring-side raceway surfaces 2a and 3a on the inner peripheral surfaces of the outer-ring split pieces 2 and 3, respectively, and by forming the journal-side raceway surface 71a on the outer peripheral surface of the crank journal 71. Consequently, the diameter reduction (miniaturization) of the roller bearing can be achieved. Further, the end surfaces of the rollers 4 axially touch the inner end surfaces of the rib portions 2c and 3c of the outer-ring split pieces 2 and 3. The axial length L1 of the projection portion 5c of the cage 5 is set to be slightly smaller than the length L2 of each of the rollers 4. Thus, the axial displacement of the cage 5 is prevented by setting the projection portion 5c of the cage 5 not to be contacted with the outer-ring split pieces 2 and 3. Accordingly, a torque loss is prevented from being caused due to the sliding resistance of the cage 5. In addition, a loss (or a chip) is prevented from being caused (or generated) from the cage 5 due to the generation of an excessive internal stress in the cage 5.

Figure 4A:
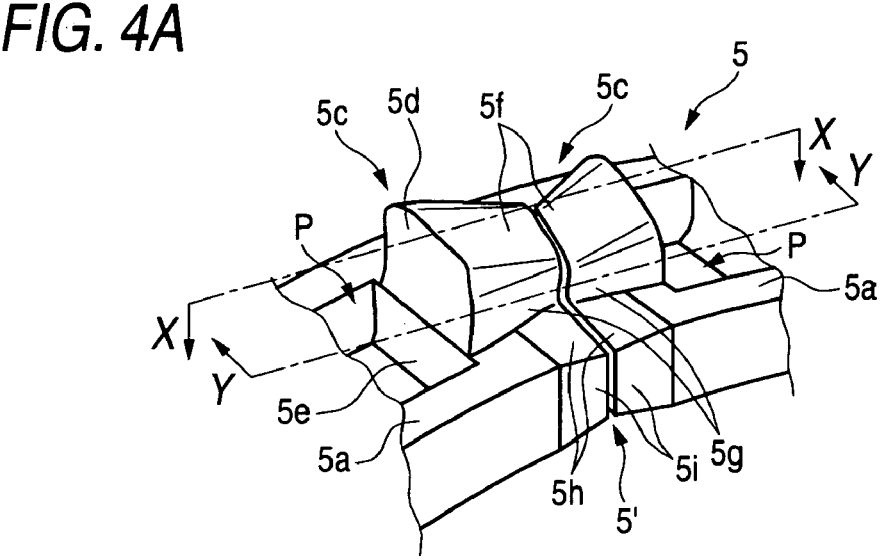
FIGS. 4A to 4C are explanatory views illustrating a split surface structure of a cage.
Figure 4B:
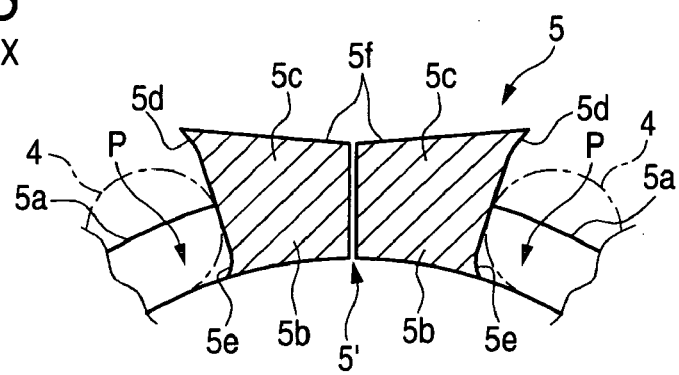

As illustrated in FIG. 4B, a holding surface 5d, which is inclined so as to be circumferentially closer to the pocket hole P toward the radially outward end thereof, is formed at an radial end portion of the projection portion 5c of the cage 5. Additionally, a holding surface 5e, which is inclined so as to be circumferentially closer to the pocket hole P toward the radially inward end thereof, is formed at the column portion 5b of the cage 5. Thus, the roller 4 can be prevented by forming the roller holding surfaces 5d and 5e from slipping off the cage 5 at the assembly of the roller bearing 1. Also, the roller 4 can be prevented from performing a radially relative displacement with respect to the cage 5 (or from slipping off therefrom).

Turning back to FIG. 2, the outer peripheral surface of the annular portion 5a of the cage 5 is disposed so as to face the inner peripheral surfaces of the rib portions 2c and 3c of the outer-ring split pieces 2 and 3 via the gap S1 at the axial end portions. The radial displacement of the rib portion 5a of the cage 5 due to the action of the centrifugal force caused by engine rotation is prevented by causing the rib portions 2c and 3c of the outer-ring split pieces 2 and 3 to touch the annular portion 5a of the cage 5. Accordingly, a torque loss can be prevented from being generated due to the sliding resistance between the radial leading end surface of the projection portion 5c of the cage 5 and the inner peripheral surfaces (the outer-ring-side raceway surfaces 2a and 3a) of the body portions 2b and 3b of the outer-ring split pieces 2 and 3. The generation of an excessive internal stress in the cage 5 and the occurrence of a loss (or the generation of a chip) can be prevented.

The radial leading end surface of the projection portion 5c of the cage 5 is disposed so as to face the inner peripheral surfaces (outer-ring-side raceway surfaces 2a and 3a) of the body portions 2b and 3b of the outer-ring split pieces 2 and 3 via the clearance S2 at the axial intermediate portion. Consequently, the radial displacement of the cage 5 due to the action of the centrifugal force caused by engine rotation can easily be prevented.

At that time, the clearance S1 between the outer peripheral surface of the annular portion 5a of the cage 5 and the inner peripheral surface of each of the rib portions 2c and 3c of the outer-ring split pieces 2 and 3 is formed so as to be smaller than the clearance S2 between the radial leading end surface of the projection portion 5c of the cage 5 and the inner peripheral surface of each of the body portions 2b and 3b of the outer-ring split pieces 2 and 3. When the centrifugal force caused by engine rotation acts upon the cage 5, the inner peripheral surface of each of the rib portions 2c and 3c of the outer-ring split pieces 2 and 3 touches the outer peripheral surface of the annular portion 5a of the cage 5 before the inner peripheral surface of each of the body portions 2b and 3b of the outer-ring split pieces 2 and 3 touches the radial leading end surface of the projection portion 5c of the cage 5. Consequently, the radial displacement of the cage 5 can be prevented in good time. Incidentally, even in a case where the outer peripheral surface of the annular portion 5a of the cage 5 touches the inner peripheral surface of each of the rib portions 2c and 3c of the outer-ring split pieces 2 and 3 so as to cause abrasion (thus generate abrasion powder) or as to cause a loss (thus generate a chip), the abrasion powder or the chip can be prevented from entering a region of the axial intermediate portion and damaging the raceway surfaces 2a, 3a, and 71a.

In this case, the following inequalities (1) and (2) hold:

$$D1 < d1 < D2 < d2 \quad (1)$$

$$d1 - D1 = 2S1 < 2S2 = d2 - D2 \quad (2)$$

where D designates an outside diameter of the annular portion 5a of the cage 5, D2 denotes a virtual outside diameter of the projection portion 5c of the cage 5, d1 represents an inside diameter of each of the rib portions 2c ands 3c of the outer-ring split pieces 2 and 3, and d2 designates an inside diameter of each of the body portions 2b and 3b of the outer-ring split pieces 2 and 3.

Figure 4C:
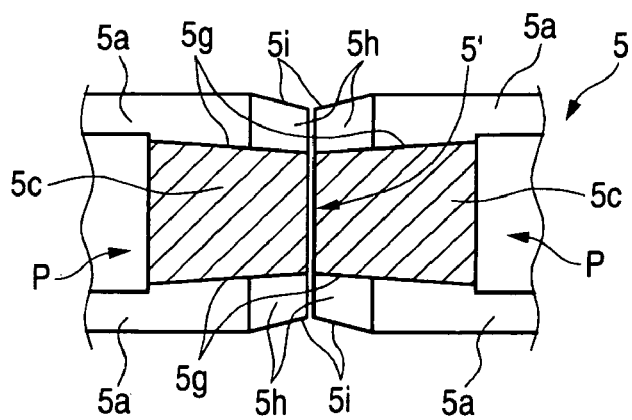

FIGS. 4A to 4C illustrate a split surface structure of the cage 5. As described above, the cage 5 includes a C-type split one to be split at one place in the circumferential direction. Split surfaces (split surfaces) 5' radially cut through the column portions 5b and the projection portions 5c. Each of first inclined surfaces 5f inclined so as to become closer to a radially, inward side towards the split surfaces 5' is formed on the leading end surface of an associated one of the projection portions 5c disposed on both sides of the clearance formed between the split surfaces 5'. Moreover, each of second inclined surfaces 5g inclined so as to become closer to an axially inward side towards the split surfaces 5' is formed on an associated one of the projection portions 5c respectively placed at both ends of the clearance formed between the split surfaces 5'.

Thus, chamfering is performed on a split place on each of the projection portions 5c, so that inclined surfaces are formed, which incline like a letter "V" to the split surfaces 5' from two directions, respectively. More specifically, the first inclined surfaces 5f formed on the leading end surfaces of the projection portions 5c are arranged so as to butt against each other. Further, the second inclined surfaces 5g formed on the end surfaces of the projection portions 5c are arranged so as to butt against each other. Consequently, even in a case where the split surfaces 5' of the cage 5 vibrate and are displaced from each other during the rotation of the crank journal 71, the cage 5 (each projection portion 5c) is difficult to touch (or collide with) the split places on the outer-ring split pieces 2 and 3. Thus, a loss (or a chip) can be prevented from being generated due to an excessive internal stress generated in the cage 5. For example, when the leading end surfaces of the projection portions 5c disposed on both sides of the clearance between the split surfaces 5' perform radial relative movement with respect to each other to thereby cause a displacement therebetween, the first inclined surface 5f provides a recess for avoiding collision between the cage 5 and each of the split places on the outer-ring split pieces 2 and 3 (the outer-ring-side raceway surfaces 2a and 3a). Similarly, when both end surfaces of the projection portions 5c disposed on both sides of the clearance between the split surfaces 5' perform axial relative movement with respect to each other to thereby cause a displacement therebetween, the second inclined surface 5g provides a recess for avoiding collision between the cage 5 and each of the split places on the outer-ring split pieces 2 and 3 (the inner-side end surfaces of the rib portions 2c and 3c).

Incidentally, each of third inclined surfaces 5h inclined so as to become located closer to a radially inward side towards the split surfaces 5' is formed on an associated one of the annular portions 5a disposed on both sides of the clearance between the split surfaces 5', respectively. Also, each of fourth inclined surfaces 5i inclined so as to become located closer to an axially inward side towards the split surfaces 5' is formed on an associated one of the annular portions 5a disposed on both sides of the clearance between the split surfaces 5', respectively.

Further, chamfering is performed on a split place of each of the annular portions 5a, so that inclined surfaces are formed, which incline like a letter "V" to the split surfaces 5' from two directions, respectively. More specifically, the third inclined surfaces 5h formed on the end surfaces of the annular portions 5a are arranged so as to butt against each other. Furthermore, the fourth inclined surfaces 5i formed on the end surfaces of the annular portions 5a are arranged so as to butt against each other. Consequently, even in a case where the split surfaces 5' of the cage 5 vibrate and are displaced from each other during the rotation of the crank journal 71, the cage 5 (each annular portion 5a) is difficult to touch (or collide with) the split places on the outer-ring split pieces 2 and 3. Thus, a loss (or a chip) can be prevented from being generated due to an excessive internal stress generated in the cage 5. For example, when the outer peripheral surfaces of the annular portions 5a disposed on both sides of the clearance between the split surfaces 5' perform radial relative movement with respect to each other to thereby cause a displacement therebetween, the third inclined surface 5h provides a recess for avoiding collision between the cage 5 and each of the split places on the outer-ring split pieces 2 and 3 (the inner peripheral surfaces of the rib portions 2c and 3c). Similarly, when both end surfaces of the annular portions 5a disposed on both sides of the clearance between the split surfaces 5' perform axial (and/or radial) relative movement with respect to each other to thereby cause a displacement therebetween, the fourth inclined surface 5i provides a recess for avoiding collision between the cage 5 and each of the split places on the outer-ring split pieces 2 and 3 (the inner peripheral surfaces of the rib portions 2c and 3c).

Embodiment 2

Figure 5:
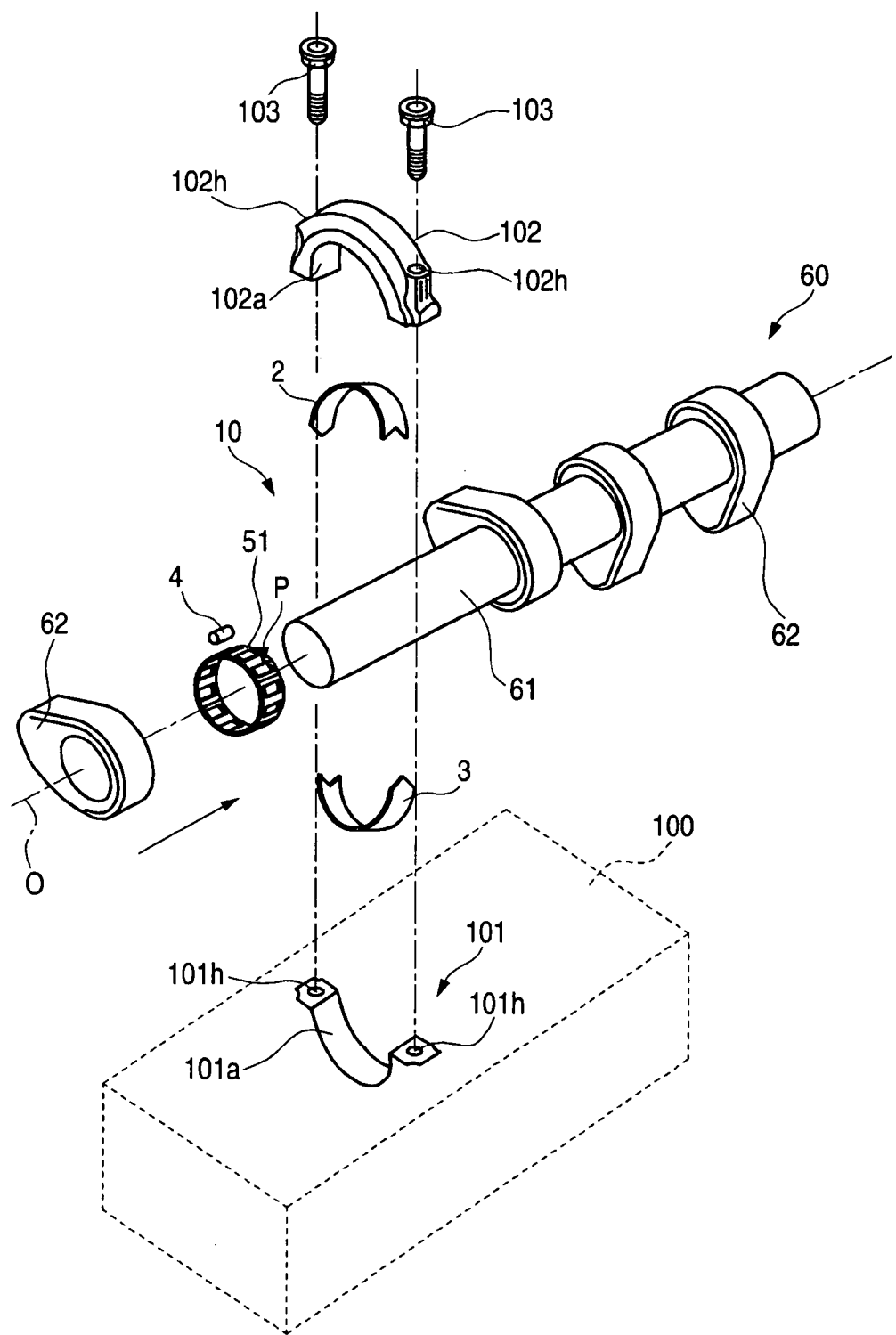
FIG. 5 is an exploded perspective view illustrating an example of a builtup camshaft having a roller bearing according to the invention.

FIG. 5 is an exploded perspective view illustrating an example of a builtup cam shaft having a roller bearing according to the invention. A builtup camshaft 60 (corresponding to the rotating shaft) has a cam lobe 62 attachable and detachable from the direction of an axis line O. Thus, an integral type cage, which can not be circumferentially split, can be used as a cage 51 for a needle roller bearing (hereunder sometimes referred to simply as a roller bearing) 10.

A cam journal 61 of the builtup camshaft 60 is put on a seat 101 (corresponding to the outer ring fixing member) formed integrally with a cylinder block (housing) 100 of an engine. The seat 101 and a cap member 102 (corresponding to the outer ring fixing member), which is disposed so as to upwardly face the seat 101 across the cam journal 61, are clamp-fixed to each other via a roller bearing 10. That is, the builtup camshaft 60 is rotatably supported by the roller bearing 10 on the cylinder head 100.

More specifically, paired internal thread holes 101h, and 101h are formed in the seat 101. Paired insertion holes 102h, and 102h are formed in the cap member 102. The cap member 102 is fixed to the seat 101 by respectively screwing bolts 103, and 103, which are passed through the insertion holes 102h, and 102h, into the internal thread holes 101h, and 101h. The roller bearing 10 is held inside the combination of a semicylindrical concave portion 101a formed in the seat 101 and a semicylindrical concave portion 101a formed in the cap member 102. That is, outer-ring split pieces 3, and 2 are fixed to the seat 101 and the cap member 102 integrally therewith, respectively. The cam journal 61 (the builtup camshaft 60) is connected to the outer-ring split pieces 3 and 2 as an inner ring that can perform relative rotation with respect thereto.

Figure 6:
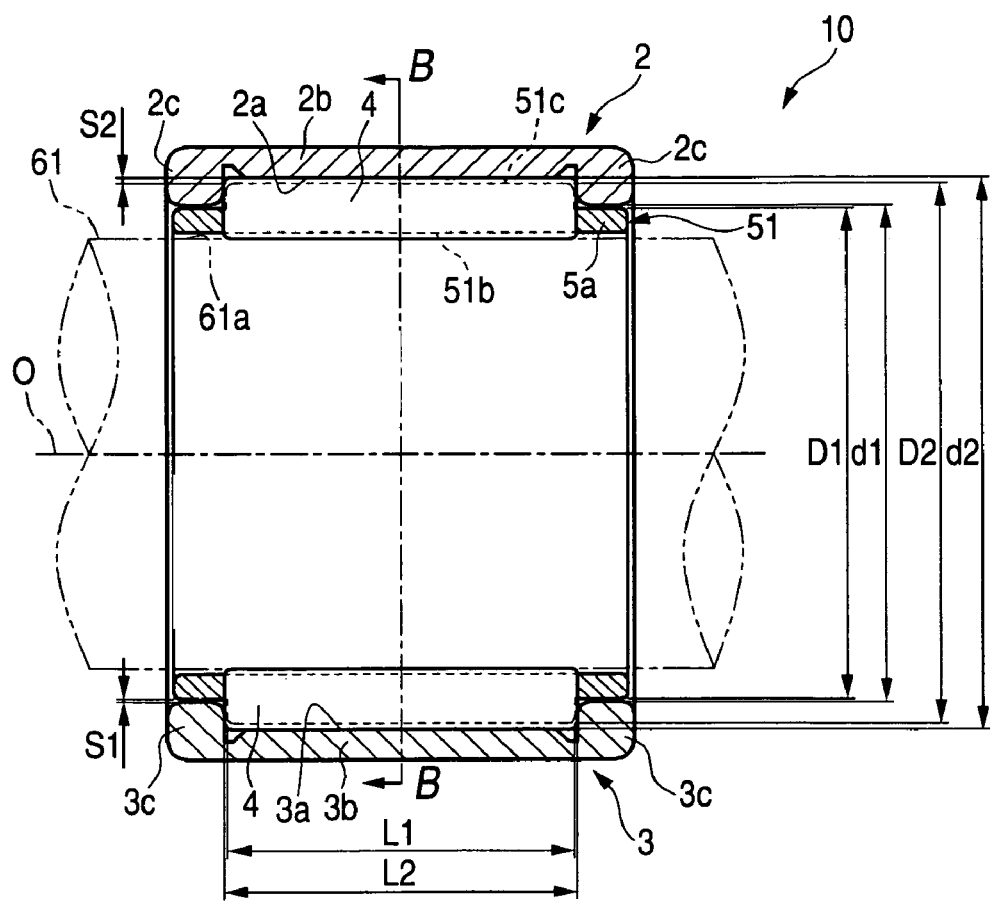
FIG. 6 is a front cross-sectional view illustrating a roller bearing shown in FIG. 5.
Figure 7:
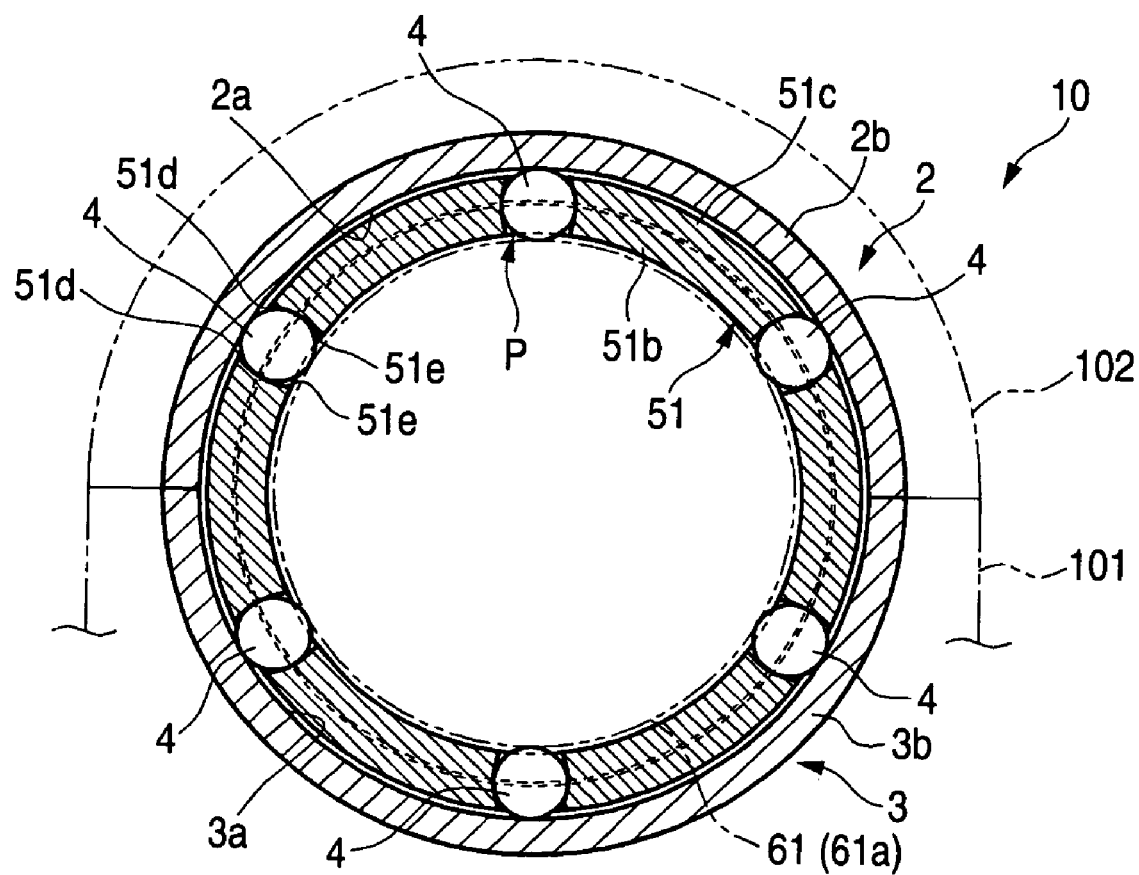
FIG. 7 is a cross-sectional view taken on line B-B shown in FIG. 6.

FIG. 6 is a front cross-sectional view illustrating a roller bearing shown in FIG. 5. FIG. 7 is a cross-sectional view taken on line B-B shown in FIG. 6. As illustrated in FIGS. 6 and 7, the roller bearing 10 includes paired copper outer-ring split pieces 2, and 3, a plurality of (e.g., 6) copper needle rollers (hereunder sometimes referred to simply as rollers) 4, and a synthetic-resin annular C-type split cage 5. Thus, Embodiment 2 shown in FIGS. 6 and 7 has a basic structure in common with Embodiment 1 shown in FIGS. 2 and 3. Therefore, detailed description of the basic structure of Embodiment 2 is omitted.

In Embodiment 1, the case of using the roller bearing 1 in the crank journal 71 has been described. However, the roller bearing 1 can be used in a crank pin 72. Further, in Embodiment 2, the case of using the roller bearing 10 in the builtup camshaft 60 has been described. However, the roller bearing 1 of Embodiment 1 can be used in a camshaft that does not have the detachable cam lobe 62.

What is claimed is:

1. A roller bearing comprising:
an outer ring cylindrically formed by combining a pair of split pieces split in a circumferential direction with each other so as to have an axis line in common with a rotating shaft;
a plurality of rollers disposed rollably between raceway surfaces respectively formed on an inner peripheral surface of said outer ring and an outer peripheral surface of said rotating shaft; and
an annular cage configured to circumferentially hold said rollers at predetermined intervals,
wherein said outer ring comprises body portions formed in an axial intermediate portion thereof and a pair of rib portions, the outer-ring-side raceway surface being formed on an inner peripheral surface of each of said body portions, each of said rib portions being formed so as to extend toward the axis line from both axial end portions configured to sandwich each of said body portions so that an end surface thereof is located radially inwardly from the outer-ring-side raceway surface of an associated one of said body portions;
said rollers roll about on the raceway surfaces respectively formed on the inner peripheral surfaces of said body portions of said outer rings and the outer peripheral surface of said rotating shaft;
said cage comprises a pair of annular portions continuously formed over the entirety of a circumference axially outwardly from both end surfaces of said rollers, and a plurality of column portions configured to connect said annular portions along an axial direction circumferentially at predetermined intervals so as to form pockets in which said roller are accommodated, a projection portion formed integrally with each of said column portions such that said projection portion protrudes outwardly over outer peripheral surfaces of said annular portions; and
the outer peripheral surface of each of said annular portions of said cage is disposed so as to face the inner peripheral surface of an associated one of said rib portions of said outer rings via a predetermined clearance.

2. The roller bearing according to claim 1, wherein a radial leading end surface of each of said projection portions of said cage is disposed so as to face the inner peripheral surface of an associated one of said body portions of said outer ring via a predetermined clearance at said axial intermediate portion, and wherein a clearance from the outer peripheral surface of each of said annular portions of said cage to an associated one of the inner peripheral surfaces of said rib portions of said outer ring is formed so as to be smaller than a clearance from the radial leading end surface of each of said projection portions of said cage to a peripheral inner surface of a corresponding one of said body portions of said outer ring.

3. The roller bearing according to claim 1, wherein a holding surface, which is inclined so as to become closer to said pocket towards a radially outward side thereof, is formed on each of said projection portions of said cage.

4. The roller bearing according to claim 1, wherein said cage is split at least one place in a circumferential direction by a split surface that includes said column portions and said projection portions and that extends along an axial direction, wherein the leading end surface of each of said projection portions, which are disposed on both sides of the split surface so as to face each other across the split surface, includes a first inclined surface inclined so as to be located closer to a radial inward side towards the split surface, and wherein both end surfaces of each of said projection portions, which are located at both ends of the split surface, include second inclined surfaces configured to be placed closer to an axially inward side towards the split surface.

* * * * *